BEST AVAILABLE COPY

United States Statutory Invention Registration [19]

Matta et al.

[11] Reg. Number: H93

[45] Published: Jul. 1, 1986

[54] ELONGATIONAL RHEOMETER

[75] Inventors: Joseph E. Matta, Bel Air; Jeffrey L. Harris, Edgewood, both of Md.

[73] Assignee: The United States of America as represented by the Secretary of the Army, Washington, D.C.

[21] Appl. No.: 779,325

[22] Filed: Sep. 23, 1985

[51] Int. Cl.[4] ..... G01N 11/04

[52] U.S. Cl. ..... 73/56

[58] Field of Search ..... 73/54, 55, 56

[56] References Cited

U.S. PATENT DOCUMENTS 3,832,886 9/1974 Pliskin .

4,454,751 6/1984 Matta et al. ..... 73/56

*Primary Examiner*—S. C. Buczinski

*Assistant Examiner*—Linda J. Wallace

*Attorney, Agent, or Firm*—Anthony T. Lane; Harold H. Card, Jr.; Michael C. Sachs

[57] ABSTRACT

An apparatus and method for measuring elongational viscosity of a test fluid comprises extruding the test fluid through a capillary downwardly into a host fluid having a lower density than the test fluid and being immiscible with the test fluid. This formed a spherical drop at the lower open end of the capillary tube which grew until it fell away from the tube forming an elongated ligament. The elongated ligament eventually breaks. The test fluid drop and ligament are photographed using a movie or video camera and the results are analyzed to determine the kinetics of the drop and ligament as it is formed, grows and falls through the host fluid.

4 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELONGATIONAL RHEOMETER

STATEMENT OF GOVERNMENT INTEREST

The invention described herein may be manufactured, used and licensed by or for the Government for Governmental purposes without the payment to us of any royalties thereon.

FIELD AND BACKGROUND OF THE INVENTION

The present invention relates in general to rheometers for measuring the flow of viscous fluids, and in particular to a new and useful elongation rheometer which is useful in measuring the elongational viscosity of a polymeric solution.

Commercially available tensile testing equipment can be used in measuring the elongational viscosity of viscous polymer melts. In such equipment a rod-like sample of the polymer melt is suspended in a silicone oil bath to compensate for gravity by using a piece of the sample, and then the sample is stretched at a constant tensile stress or constant strain rate. This equipment measures the force necessary to stretch the rod-like sample at the constant strain rate in order to determine the elongational viscosity thereof.

Polymer solutions however, have viscosities which are far too low to form a stable rod-like sample and therefore cannot be tested using commercially available tensile testing machines. It is important however, to measure the elongational viscosity of polymer solutions because they play a significant role in many processes such as atomization. For example, when Newtonian liquids are subjected to relatively high air velocities, small particles normally result. To increase the drop size of the atomized fluid, polymers are often added. With this addition of polymer, non-Newtonian viscoelastic solutions are produced.

Various techniques have been reported which investigates the stretching flow of low viscosity solutions. See for example Petrie, C. J. S. (1979), *Elongational Flows*, Academic Press, New York and London. This article gives an excellent summary of these experiments and their particular limitations. Also see Jones, W. M. and Rees, I. J. (1982), *The Stringiness of Dilute Polymer Solutions*, J. Non-Newtonian Fluid Mechanics, II, 257–268. This article describes a falling drop experiment to estimate the apparent elongational viscosity of dilute polymer solutions. An apparent elongational viscosity is reported since the elongation rate varied throughout the stretching process.

SUMMARY OF THE INVENTION

The present invention is drawn to a method and apparatus for measuring elongational viscosity of fluids, particularly fluids having low viscosity, which produce reliable and reproducible data.

According to the present invention the fluid to be tested is slowly extruded vertically and downwardly through a capillary tube into an immiscible fluid of lower density. The heavier test fluid forms a spherical drop near the open nozzle end of the capillary tube which grows and eventually separates from the tube stretching and trailing a ligament. The ligament eventually breaks as the drop of test fluid falls through the immiscible host fluid. From an investigation of the ligament and kinetics of the falling drop it is possible to measure the elongational viscosity of the extruded test fluid. The falling drop and attached ligament are photographed using a movie camera or video camera and the moving pictures can then be analyzed to determine the test fluid kinetics.

The elongational viscosity $n_e$ is defined as:

$$n_e = T_{11}/E \tag{1}$$

wherein $T_{11}$ is the ligament stretching force and E is the elongation rate.

By analysing the drop and ligament kinetics it is possible to determine $T_{11}$ using the following expression which is derived from Newton's second law of physics:

$$T_{11} = V/\pi R^2[1 - cdV_z/C_{dt}V_{zt}]\Delta\rho - V(\rho + \rho\pi\Delta A/2-)ad/\pi R^2 \tag{2}$$

Where $\Delta\rho$ is the density difference between the drop ($\rho$) and the host fluid ($\rho\pi$). V is the drop volume, Cd is the drag coefficient, $V_z$ is the fall velocity, ad is the drop acceleration, R is the drop radius, and $\Delta A$ is an empirical coefficient determined from the drag on a sphere executing simple harmonic motion.

$\Delta A = 1.05 - 0.66/(A_c^2 + 0.12)$ where $A_c$ is the acceleration number, $V_z^2$ (2R $dV_z/dt$). The "t" subscript in equation 2 refers to the terminal values. The elongation rate is defined as:

$$E = 2V_r/R \tag{3}$$

where $V_r$ is the rate of change of the radius of the ligament, expressed in meters per second as it gets progressively smaller with time as the ligament stretches and becomes thinner and thinner until it snaps which is determined from the time sequence photos of the ligament.

Accordingly an object of the present invention is to provide a method of measuring elongation viscosity of a test fluid comprising extruding the test fluid vertically downwardly through a capillary tube into a host fluid which has lower density than the test fluid and is immiscible therewith, to form a spherical drop of the test fluid at a lower open end of the capillary tube in the host fluid, continuing to extrude the test fluid through the capillary tube so that the drop grows, then falls in the host fluid away from the capillary tube, the drop being connected to the capillary tube by a stretching trailing ligament of the test fluid, and then the ligament breaks, taking time sequence pictures of the drop as it is formed, grows and falls and as the ligament stretches and breaks, and analyzing the time sequence photographs to determine kinetics for the drop and ligament which can be used as a function of elongational viscosity to find the elongational viscosity of the test fluid.

A further object of the invention is to provide equipment which can be used in measuring the elongational viscosity of the test fluid which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated

Figure 3:
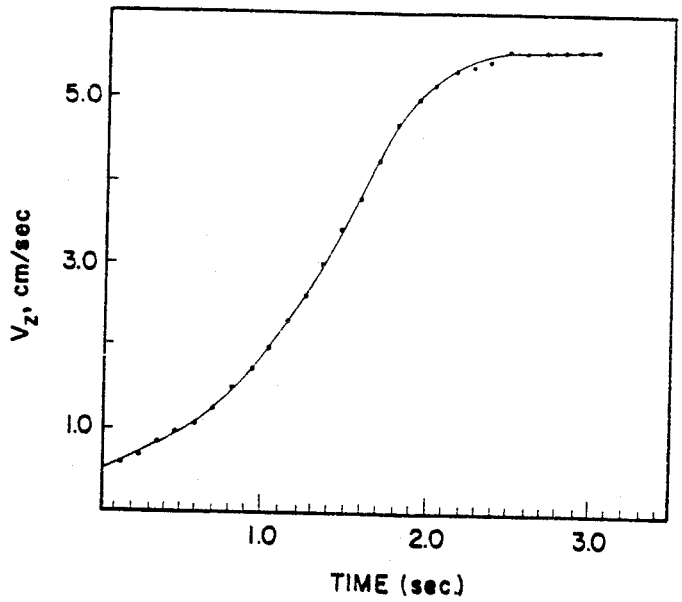
Figure 4:
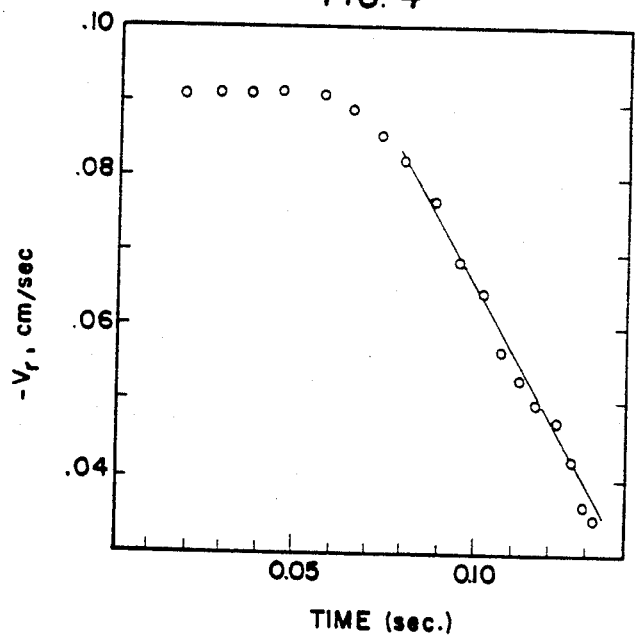
Figure 5:
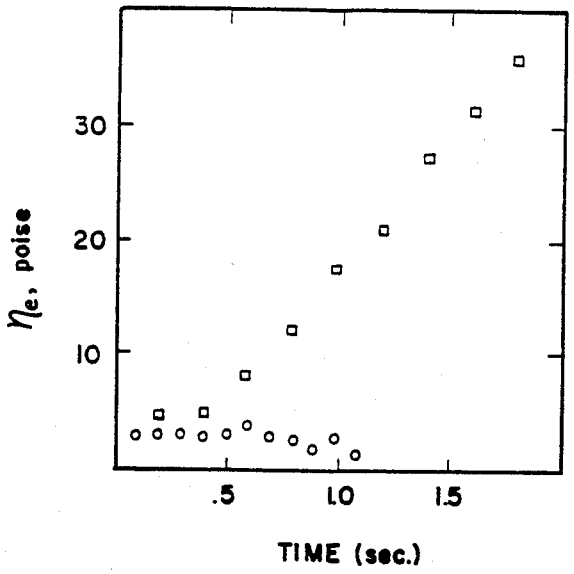
Figure 6:
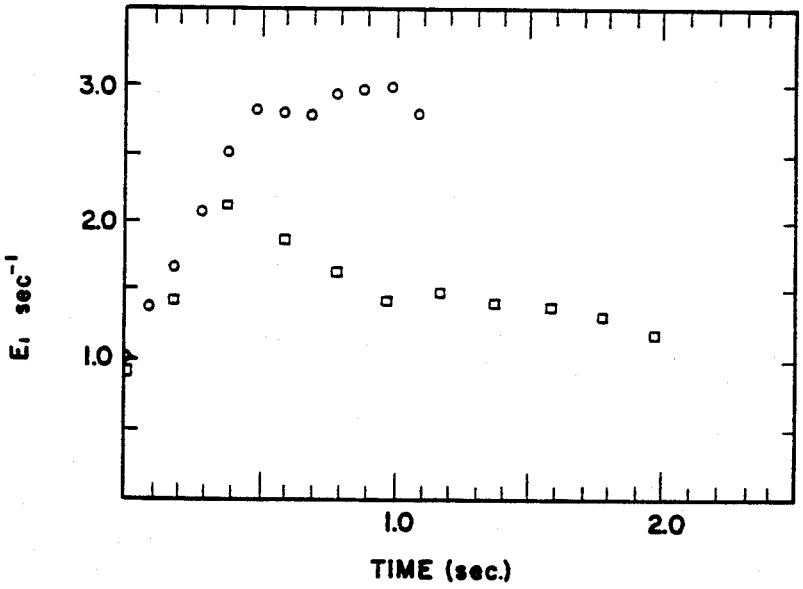

FIG. 3 is a graph relating the falling velocity of a silicon drop to time;

FIG. 4 is a graph relating the radial ligament velocity for the silicone drop to time;

FIG. 5 is a graph relating the elongational viscosity to time for two polymeric solutions; and FIG. 6 is a graph relating the elongation rate to time for the same two polymeric solutions as in FIG. 5.

DESCRIPTION OF THE PREFERRED EMBODIMENT

Figure 1:
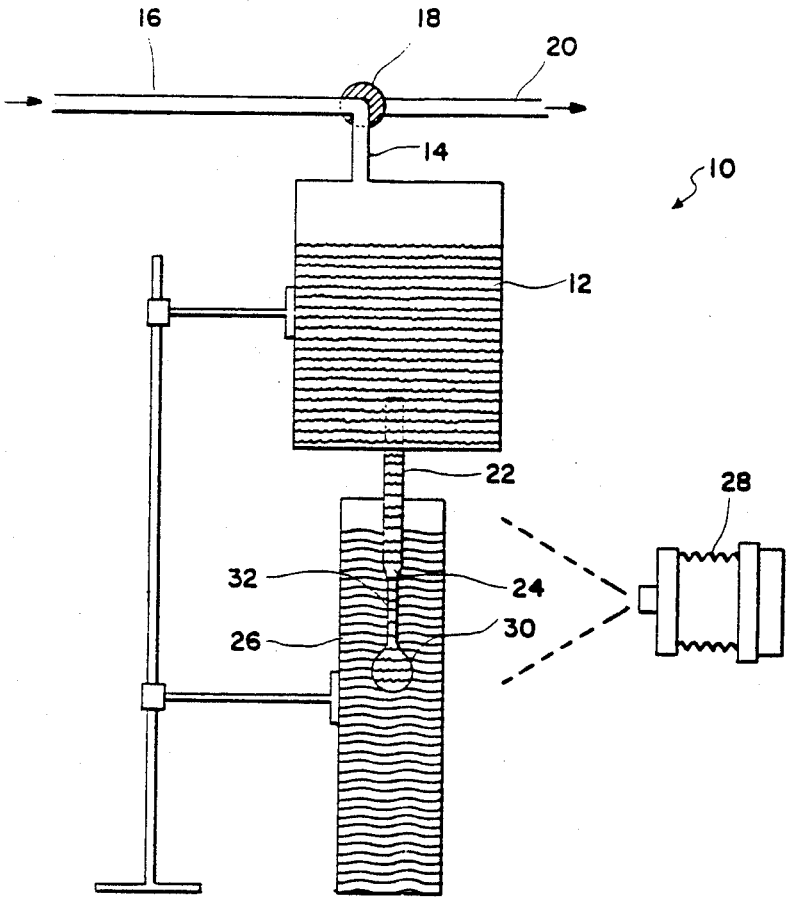
FIG. 1 is a schematic side view of the inventive equipment for practicing the inventive method.

Referring to the drawings in particular, the invention embodied in FIG. 1 comprises an apparatus generally designated 10 for measuring the elongation viscosity of fluids having relatively low viscosity, in particular polymeric solutions.

The equipment includes a test fluid reservoir 12 which contains a polymeric solution or other low viscosity fluid to be tested. An air line 14 is connected to the top of reservoir 12 for pressurizing the test fluid. A pressure regulated air line 16 is connectable over a valve 18 to the line 14 for pressurizing the reservoir 12. Valve 18 may be rotated to communicate line 14 with a vent line 20 for releasing the pressure in reservoir 12 to the atmosphere.

A capillary tube 22 is connected at the bottom of reservoir 12 and terminates at a nozzle 24. Nozzle 24 is immersed in an immiscible host fluid carried in a host fluid reservoir 26. Reservoir 26 is in the form of a transparent cylinder made of glass or the like so that the contents of reservoir 26 can be photographed by a movie or video camera 28.

In operation, valve 18 is brought to the position shown in FIG. 1 to pressurize the space above the test fluid in reservoir 12. This forces test fluid to be extruded through capillary tube 22 and out nozzle 24. A spherical drop of test fluid 30 first forms immediately at nozzle 24. As the extrusion process continues the drop enlarges and begins to fall from the nozzle 24. Drop 30 is connected to the nozzle by a stretching trailing ligament 32. Eventually ligament 32 breaks. The entire drop forming, enlarging and falling process is photographed in a series of time sequence pictures by camera 28. The pictures can then be analyzed to determine the ligament stretching force $T_{11}$ and the elongation rate E.

In an actual experiment a 16 mm pin registered movie camera was used as camera 28 with a timing dot generator to accurately determine the framing rate. The film was later analyzed on a film motion analyzer of known design.

Results of the actual experiment are illustrated in the graphs of FIGS. 2 through 6.

In the experiment a 15 cm long capillary tube 22 was positioned so that it extended by 2 cm into a rectangular glass tube forming host fluid reservoir 26. The rectangular glass tube 26 was 5.2 cm×5.1 cm×30.5 cm. It was filled with the less dense host liquid which, for the purpose of the experiment, was a 35% aqueous ethyl alcohol solution by weight.

The test fluid was liquid 1.0 Pa.s silicone fluid.

Reservoir 12 was pressurized by placing valve 18 in the position shown in FIG. 1. A sphere of test fluid first appeared and then began to grow at the nozzle 24 of capillary tube 22. This continued until the surface tension of the host fluid could no longer support the drop. At this point, the drop began to fall while it maintained apparently constant size. As it fell it stretched and trailed the connecting ligament 32. Time sequence photographs were taken by camera 28.

The time history of the measured drop for velocity $V_z$ is shown in FIG. 3. FIG. 3 shows an approximate 3½ second duration. As the drop 30 fell, the connecting ligament 32 decreased in diameter until it finally broke at about 1.8 seconds into the test. This formed a few small satallite spheres. Shortly after breakage the drop acquired its terminal velocity of 5.5 cm per second. From the slope of the velocity curve in FIG. 3, taken at 0.1 second intervals, the drop acceleration was obtained. In addition, the drop fall velocity and the ligament radial velocity $V_r$ was also determined from the film and from the first second of stretching was found to vary linearly with the ligament radius as shown in FIG. 4. From equation (3) above, the following was found for the radial velocity:

$$V_r(\text{cm/s}) = 0.852R\ (\text{cm}) - 0.150 \quad (4)$$

From equation (4) it was found that the elongation rate for the 10 poise silicone fluid was:

$$E\ (\text{sec}^{-1}) = -1.70 + 0.30/R\ (\text{cm}) \quad (5)$$

Figure 2:
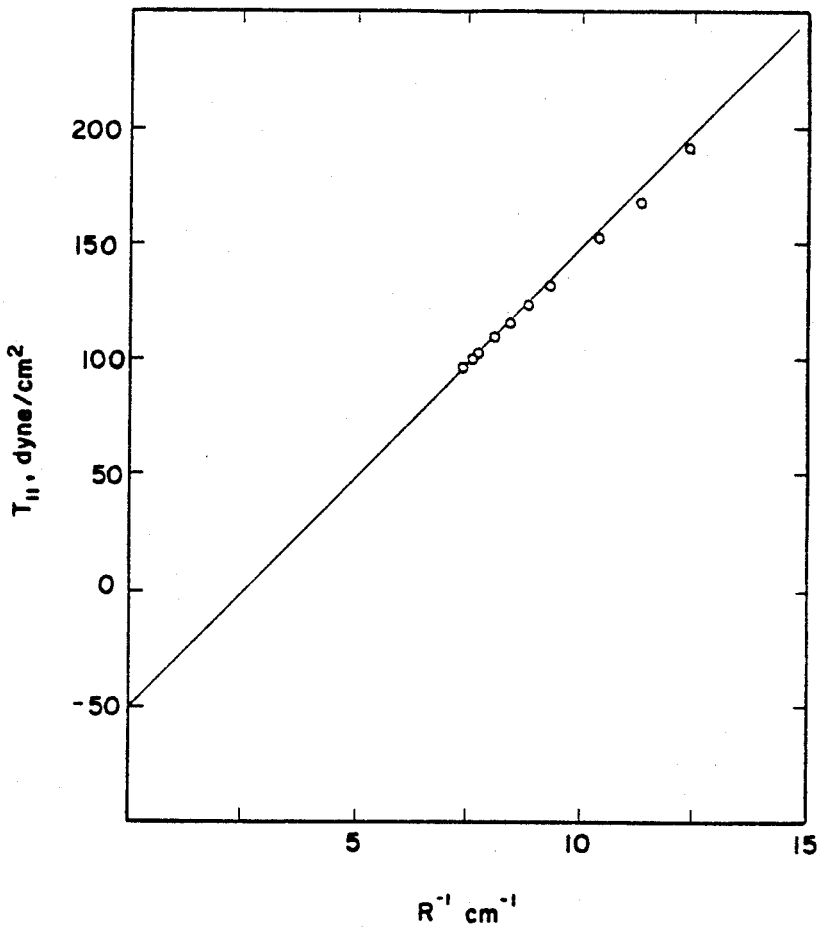
FIG. 2 is a graph relating the ligament stretching force to the reciprocal of drop radius for a 10 poise silicone drop.

Equation (2) was then utilized to produce the results shown in FIG. 2. These results showed excellent agreement with calculated values for $T_{11}$.

Two polymer solutions were tested using the submerged falling drop method of the present invention. The solutions used were diethylmalanate, which was converted into a viscoelastic liquid by the addition of either high molecular weight ($6\times10^6$) polymethylmethacrylate (PMMA) at a 1.5% by weight concentration or a polymer or lower molecular weight ($2\times10^6$) composed of 80% PMMA and 20% poly (ethyl/butyl acrylate) at a 5% concentration Sheer viscosities were measured with a cone and plate rheometer. At low sheet rates both the PMMA and copolymer solutions exhibited a Newtonian region with zero sheer values of 1.5 and 1.0 Pa.s, respectively. As the sheer rate increased the viscosity of each fluid decreased in a power law manner typical of most polymer solutions.

The hose fluid used for the viscoelastic tests was a 10% by weight aqueous glycerol solution. FIG. 5 shows the measured elongational viscosity variation with time for the two polymer solutions with the squares representing results for the PMMA and circles representing results for the copolymer. FIG 5 shows an apparent rather than a true elongation viscosity since the stretch rate is not constant. This is shown in FIG. 6.

While a specific embodiment of the invention has been shown and described in detail to illustrate the application of the principles of the invention, it will be understood that the invention may be embodied otherwise without departing from such principles.

What is claimed is:

1. A method of measuring elongational viscosity of a test fluid comprising:

extruding the test fluid vertically downwardly through a capillary tube into a host fluid to form a spherical drop of the test fluid at a lower open end of the capillary tube in the host fluid;

continuing to extrude the test fluid through the capillary tube so that said spherical drop grows, then falls in the host fluid and away from the capillary tube, the drop being connected to the capillary tube by a stretching trailing ligament of the test fluid, and then the ligament breaks in the host fluid;

taking time sequence pictures of the drop as it is formed, grows and falls, and as the ligament stretches and breaks; and analyzing the time sequence pictures to determine the falling velocity of the drop and the radial ligament velocity of the ligament which are used to calculate the elongated viscosity of the test fluid.

2. A method according to claim 1 including a host fluid which has a lower density than the test fluid and which is immiscible with respect to the test fluid.

3. A method according to claim 1, including confining the test fluid in a reservoir with the capillary tube extending downwardly from the reservoir and pressurizing a space in the reservoir above the test fluid for extruding the test fluid through the capillary tube.

4. A method according to claim 3, including confining the host fluid in rectangular host fluid reservoir having at least one transparent wall and taking the time sequence pictures through the one transparent wall.

* * * * *